United States Patent
Golding et al.

(10) Patent No.: US 10,126,141 B2
(45) Date of Patent: Nov. 13, 2018

(54) SYSTEMS AND METHODS FOR USING REAL-TIME IMAGERY IN NAVIGATION

(71) Applicant: GOOGLE INC., Mountain View, CA (US)

(72) Inventors: Andrew R. Golding, Sunnyvale, CA (US); Kevin Murphy, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/144,300

(22) Filed: May 2, 2016

(65) Prior Publication Data
US 2017/0314954 A1   Nov. 2, 2017

(51) Int. Cl.
*G01C 21/36* (2006.01)

(52) U.S. Cl.
CPC ..... *G01C 21/3644* (2013.01); *G01C 21/3602* (2013.01); *G01C 21/3623* (2013.01); *G01C 21/3679* (2013.01); *G01C 21/3691* (2013.01)

(58) Field of Classification Search
CPC ............ G01C 21/3602; G01C 21/3623; G01C 21/3644; G01C 21/3647; G01C 21/3679; G06K 9/00818
See application file for complete search history.

(56) References Cited

U.S. PATENT DOCUMENTS

| 6,078,865 | A | * | 6/2000 | Koyanagi | .......... | G01C 21/3644 |
| | | | | | | 340/988 |
| 6,323,807 | B1 | * | 11/2001 | Golding | ................ | G01C 21/20 |
| | | | | | | 342/419 |
| 7,831,387 | B2 | | 11/2010 | Golding et al. | | |

(Continued)

FOREIGN PATENT DOCUMENTS

| EP | 2 290 323 A1 | 3/2011 |
| JP | 11271074 A  * | 10/1999 |

(Continued)

OTHER PUBLICATIONS

Beeharee et al., "A Natural Wayfinding—Exploiting Photos in Pedestrian Navigation Systems," Mobile HCI'06, Helsinki, Finland, pp. 81-88, 2006.

(Continued)

*Primary Examiner* — Behrang Badii
*Assistant Examiner* — David A Testardi
(74) *Attorney, Agent, or Firm* — Marshall, Gerstein & Borun LLP

(57) ABSTRACT

To generate navigation directions for a driver of a vehicle, a route for guiding the driver to a destination is obtained, visual landmarks corresponding to prominent physical objects disposed along the route are retrieved, and real-time imagery is collected at the vehicle approximately from a vantage point of the driver during navigation along the route. Using (i) the retrieved visual landmarks and (ii) the imagery collected at the vehicle, a subset of the visual landmarks that are currently visible to the driver is selected. Navigation directions describing the route are provided the driver, the navigation directions referencing the selected subset of the visual landmarks and excluding the remaining visual landmarks.

20 Claims, 7 Drawing Sheets

(56) References Cited

U.S. PATENT DOCUMENTS

| | | | | |
|---|---|---|---|---|
| 7,912,637 | B2* | 3/2011 | Horvitz | G01C 21/3476 701/33.4 |
| 7,920,968 | B2 | 4/2011 | Chapin et al. | |
| 8,478,515 | B1 | 7/2013 | Foucher et al. | |
| 9,623,905 | B2* | 4/2017 | Shashua | B62D 15/025 |
| 9,631,943 | B2* | 4/2017 | Shashua | G01C 21/32 |
| 2005/0288859 | A1* | 12/2005 | Golding | G01C 21/3602 701/438 |
| 2006/0009188 | A1* | 1/2006 | Kubota | G08G 1/096725 455/344 |
| 2006/0244830 | A1* | 11/2006 | Davenport | B61L 25/021 348/148 |
| 2006/0271286 | A1 | 11/2006 | Rosenberg | |
| 2007/0055441 | A1 | 3/2007 | Retterath et al. | |
| 2007/0078596 | A1 | 4/2007 | Grace | |
| 2007/0233380 | A1* | 10/2007 | Tanaka | G01C 21/3602 701/436 |
| 2009/0177378 | A1* | 7/2009 | Kamalski | G01C 21/26 701/408 |
| 2010/0176987 | A1* | 7/2010 | Hoshizaki | G01S 19/48 342/357.23 |
| 2010/0250126 | A1* | 9/2010 | Epshtein | G01C 21/3602 701/438 |
| 2012/0136505 | A1* | 5/2012 | Mori | G01C 21/3602 701/1 |
| 2013/0170706 | A1* | 7/2013 | Mori | G01C 21/3602 382/103 |
| 2013/0253754 | A1* | 9/2013 | Ferguson | G05D 1/0231 701/28 |
| 2013/0261969 | A1* | 10/2013 | Nakamura | G01C 21/3602 701/533 |
| 2013/0304383 | A1* | 11/2013 | Bageshwar | G01C 21/165 701/534 |
| 2016/0178389 | A1* | 6/2016 | Hainzlmaier | G01C 21/3602 701/467 |
| 2016/0231135 | A1* | 8/2016 | Nishibashi | G01C 21/3629 |
| 2016/0305794 | A1* | 10/2016 | Horita | G01C 21/3602 |
| 2016/0355182 | A1* | 12/2016 | Remillard | B60W 30/14 |
| 2017/0069208 | A1* | 3/2017 | Nair | G01C 21/3415 |
| 2017/0350719 | A1* | 12/2017 | Moore | G01C 21/3682 |

FOREIGN PATENT DOCUMENTS

| | | | | |
|---|---|---|---|---|
| WO | WO 2010081549 A1 * | 7/2010 | | G01C 21/3644 |
| WO | WO-2012/111258 A1 | 8/2012 | | |
| WO | WO 2016/130719 A2 * | 8/2016 | | |

OTHER PUBLICATIONS

Harris et al., "Digital Map Dependent Functions of Automatic Vehicle Location Systems," IEEE, CH2675-7/88/0000-0079, pp. 79-88, 1988.

Kray et al., "Presenting Route Instructions on Mobile Devices," IUI'03, Miami, Florida, pp. 117-125, 2003.

"Using Real-Time Imagery for Enhanced Driving Directions," Google (2015).

International Search Report and Written Opinion for Application No. PCT/US2017/030412, dated Sep. 25, 2017.

"Cityscapes Dataset," (2016). Retrieved from the Internet at: URL:https://www.cityscapes-dataset.com/.

"Physically Grounded Scene Interpretation," (2016) Retrieved from the Internet at :URL:http://dhoiem.cs.illinois.edu/projects/interpretation_project.html.

Brubaker, M., Geiger, A. & Urtasun, R., 2015. Map-Based Probabilistic Visual Self-Localization. *IEEE transactions on pattern analysis and machine intelligence*, PP(99), pp. 1-1. Available at: URL:http://ieeexplore.ieee.org/xpl/articleDetails.jsp?arnumber=7152950.

Chen, L.-C. et al., 2015. Semantic Image Segmentation with Deep Convolutional Nets and Fully Connected CRFs. In ICLR. Available at: http://arxiv.org/abs/1412.7062.

Eigen, D. & Fergus, R., 2015. Predicting Depth, Surface Normals and Semantic Labels with a Common Multi-Scale Convolutional Architecture. In ICCV. Available at: http://arxiv.org/abs/1411.4734.

Li, G. & Yu, Y., 2015. Visual Saliency Based on Multiscale Deep Features. In CVPR. Available at: http://arxiv.org/abs/1503.08663.

Ren, S. et al., 2015. Faster R-CNN: Towards Real-Time Object Detection with Region Proposal Networks. In *NIPS*. Available at: http://arxiv.org/abs/1506.01497.

Szegedy, C. et al., 2014. Scalable, High-Quality Object Detection. *arXiv [Cs.CV]*. Available at: http://arxiv.org/abs/1412.1441.

Tribune Content Agency, "Microsoft's Inclusive Design," (2016). Retrieved from the Internet at: URL:http://tribunecontentagency.com/article/microsoft039s-inclusive-design/.

Zeeshan Zia, M., Stark, M. & Schindler, K., 2014. Towards Scene Understanding with Detailed 3D Object Representations. International journal of computer vision, 112(2), pp. 188-203. Available at: http://arxiv.org/abs/1411.5935.

Hile et al., "Landmark-Basd Pedestrian Navigation from Collections of Geotagged Photos," Proceedings of the 7th International Conference on Mobile and Ubiquitous Multimedia, pp. 145-152 (2008).

Hile et al., "Landmark-Based Pedestrian Navigation with Enhanced Spatial Reasoning," International Conference on Pervasive Computing (2009).

* cited by examiner

SYSTEMS AND METHODS FOR USING REAL-TIME IMAGERY IN NAVIGATION

FIELD OF THE DISCLOSURE

The present disclosure relates to navigation directions and, in particular, to using imagery in navigation directions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Systems that automatically route drivers between geographic locations generally utilize indications of distance, street names, building numbers, to generate navigation directions based on the route. For example, these systems can provide to a driver such instructions as "proceed for one-fourth of a mile, then turn right onto Maple Street." However, it is difficult for drivers to accurately judge distance, nor is it always easy for drivers to see street signs. Moreover, there are geographic areas where street and road signage is poor.

To provide guidance to a driver that is more similar to what another person may say to the driver, it is possible to augment navigation directions with references to prominent objects along the route, such as visually salient buildings or billboards. These prominent object can be referred to as "visual landmarks." Thus, a system can generate such navigation directions as "in one fourth of a mile, you will see a McDonald's restaurant on your right; make the next right turn onto Maple Street." To this end, an operator can enter descriptions and indications of locations (e.g., street addresses, coordinates) for visual landmarks, so that the system can automatically select suitable visual landmarks when generating navigation directions.

However, not every landmark is visible at all times. For example, some billboards may be brightly illuminated at night but may be generally unnoticeable during the day. On the other hand, an intricate façade of a building may be easy to notice during the day but may be poorly illuminated and accordingly unnoticeable at night.

SUMMARY

Generally speaking, a system of this disclosure provides a driver with navigation directions using visual landmarks that are likely to be visible at the time when the driver reaches the corresponding geographic location. In one implementation, the system selects visual landmarks from a relatively large and redundant set of previously identified visual landmarks. To make the selection, the system can consider one or more of the time of day, the current weather conditions, the current season, etc. Moreover, the system can utilize real-time imagery collected by the dashboard camera, the camera of a smartphone mounted on the dashboard, or another camera that approximately corresponds to the vantage point of the driver. As discussed in more detail below, the system also can use implicit and explicit feedback regarding visibility and/or prominence of physical objects to improve subsequent references to visual landmarks.

An example embodiment of these techniques is a method for generating navigation directions for drivers, executed by one or more processors. The method includes obtaining a route for guiding a driver of a vehicle to a destination, retrieving visual landmarks corresponding to prominent physical objects disposed along the route, obtaining real-time imagery collected at the vehicle approximately from a vantage point of the driver during navigation along the route, and using (i) the retrieved visual landmarks and (ii) the imagery collected at the vehicle, selecting a subset of the visual landmarks that are currently visible to the driver. The method further includes providing, to the driver, navigation directions describing the route, the navigation directions referencing the selected subset of the visual landmarks and excluding the remaining visual landmarks.

Another example embodiment of these techniques is a system operating in a vehicle. The system includes a camera configured to capture real-time imagery approximately from a vantage point of the driver, a positioning module configured to determine a current geographic location of the vehicle, a network interface to communicate with a server system via a communication network, a user interface, and processing hardware configured to (i) obtain, using the captured real-time imagery and the current geographic location of the vehicle, driving directions including an instruction that references a visual landmark automatically determined as being visible in the captured real-time imagery, and (ii) provide the instruction to the driver via the user interface.

Yet another example embodiment of these techniques is a method in a mobile system operating in a vehicle for providing driving directions. The method comprises receiving a request for driving directions to a destination from a driver of the vehicle, receiving real-time imagery collected at the vehicle approximately from a vantage point of the driver, obtaining, using the real-time imagery and a current location of the vehicle, the driving directions including an instruction that references a visual landmark automatically determined as being visible in the real-time imagery, and providing the instruction to the driver in response to the request.

Still another example embodiment of this technique is a method for generating navigation directions for drivers. The method includes obtaining, by one or more processors, a route for guiding a driver of a vehicle to a destination as well as real-time imagery collected at the vehicle approximately from a vantage point of the driver during navigation along the route. The method further includes automatically identifying, by the one or more processors, a physical object within the real-time imagery to be used as a visual landmark in navigation, including recognizing at least one of (i) one of a finite set of pre-set objects or (ii) text within the real-time imagery. Further, the method includes determining a position of the physical object relative to a point on the route, and providing, to the driver, navigation directions describing the route, the navigation directions including a reference to the identified physical object.

DETAILED DESCRIPTION

Overview

Figure 1:
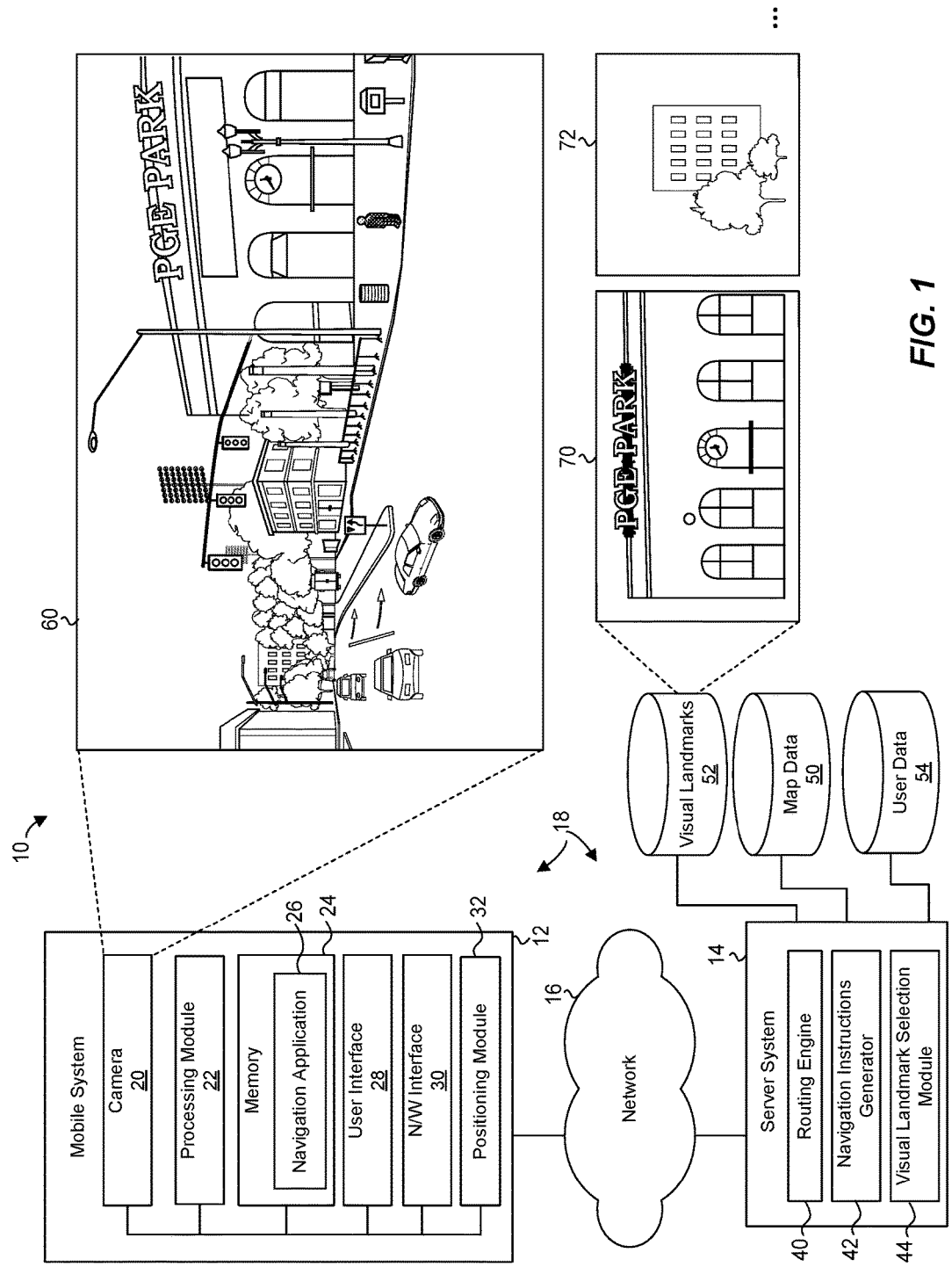
FIG. 1 is a block diagram of an example computing system that generates navigation directions in view of real-time imagery collected from approximately the user's vantage point, according to one implementation.

To better guide a driver along a navigation route, a system collects real-time imagery from approximately the user's vantage point (e.g., using a dashboard camera, a camera built into the vehicle, the user's smartphone mounted on the dashboard), retrieves a set of visual landmarks for the user's current position along the navigation route, and uses the real-time imagery to determine which of the retrieved visual landmarks should be used to augment step-by-step navigation directions for the navigation route, according to one implementation. In this manner, the system omits visual landmarks that are occluded by trees or vehicles, obscured due to current lighting conditions, or poorly visible from the user's current vantage for some other reason.

In addition to selecting salient visual landmarks from among pre-stored static landmarks, the system can identify dynamic visual landmarks, such as changing electronic billboards or trucks with machine-readable text. When capable of automatically recognizing such an object in the video or photo feed, the system can position the object relative to the next navigation instruction and reference in the object in the navigation instruction. For example, the system can modify the instruction "turn left in 200 feet" to "turn left by the red truck." Moreover, the system in some scenarios may select a route from among multiple routing options based on live states of traffic lights. For example, the system may determine that the red light at the intersection the driver is approaching makes another routing option more appealing.

Additionally or alternatively to processing real-time imagery, the system can assess the usefulness of a certain visual landmark based on explicit and/or implicit user signals. For example, the driver can indicate that she cannot see a landmark, using a voice command. When it is desirable to collect more information about visual landmarks, the system can present visual landmarks in interrogative sentences, e.g., "do you see the billboard on the left?" As an example of an implicit signal, when drivers tend to miss a turn which the system describes using a visual landmark, the system may flag the visual landmark as not useful. The system can assess usefulness at different times and under weather conditions, so that a certain billboard can be marked as not useful during daytime but useful when illuminated at night. Further, the system can receive signals indicative of current time, weather conditions, etc. from other sources, such as a weather service, and select landmarks suitable for the current environmental conditions. The system can use explicit and/or implicit user feedback to modify subsequent navigation directions even when no real-time video or still photography is available to a driver. For example, the system may be able to determine only that the driver is requesting navigation directions at nighttime, and accordingly provide indications of visual landmarks that have been determined to be visible, or particularly well noticeable, at night.

The system can use object and/or character recognition techniques to automatically recognize vehicles, billboards, text written on surfaces of various kind, etc. Further, to identify currently visible landmarks within real-time imagery, the system can match features of an image captured with an image previously captured from the location and with the same orientation of the camera (i.e., with the same camera pose) and known to depict a visual landmark. In some implementations, the system uses a convolutional neural network to implement an object detector which determines whether a captured scene includes an object of one of predefined classes (e.g., car, person, traffic light). Further, the object detector can implement semantic segmentation to label every pixel in the image.

Example Computing Environment

FIG. 1 illustrates an environment 10 in which at least some of the techniques for selecting salient visual landmarks can be implemented. The environment 10 includes a mobile system 12 and a server system 14 interconnected via a communication network 16. The server system 14 in turn can communicate with various databases and, in some implementations, third-party systems such as a live traffic service or a weather service (not shown to avoid clutter). A landmark selection system 18 configured to select visual landmarks using real-time imagery and/or time of day, season, weather, conditions, etc. can be implemented in the mobile system 12, the server system 14, or partially in mobile system 12 and partially in the server system 14.

The mobile system 12 can include a portable electronic device such as a smartphone, a wearable device such as a smartwatch or a head-mounted display, or a tablet computer. In some implementations or scenarios, the mobile system 12 also includes components embedded or mounted in a vehicle. For example, a driver of a vehicle equipped with electronic components such as a head unit with a touch-screen or a built-in camera can use her smartphone for navigation. The smartphone can connect to the head unit via a short-range communication link such as Bluetooth® to access the sensors of the vehicle and/or to project the navigation directions onto the screen of the head unit. As another example, the user's smartphone can connect to a standalone dashboard camera mounted on the windshield of the vehicle. More generally, modules of a portable or wearable user device, modules of a vehicle, and external devices or modules of devices can operate as components of the mobile system 12.

These components can include a camera 20, which can be a standard monocular camera mounted on the dashboard or windshield. In some scenarios, the driver mounts the smartphone so that the camera of the smartphone faces the road similar to a dashboard camera. In other scenarios, the vehicle includes a camera or even multiple cameras built into dashboard or the exterior of the vehicle, and the mobile system 12 accesses these cameras via a standard interface (e.g., USB). Depending on the implementation, the camera 20 is configured to collect a digital video stream or capture still photographs at certain intervals. Moreover, the mobile system 12 in some implementations uses multiple cameras to collected redundant imagery in real time. One camera may be mounted on the left side of the dashboard and another camera may be mounted on the right side of the dashboard to generate a slightly different views of the surroundings, which in some cases may make it easier for the landmark selection system 18 to compare real-time imagery to previously captured images of landmarks.

The mobile system 12 also can include a processing module 22, which can include one or more central processing unit (CPUs), one or more graphics processing unit (GPUs) for efficiently rendering graphics content, an application-specific integrated circuit (ASIC), or any other suitable type of processing hardware. Further, the mobile system 12 can include a memory 24 made up of persistent (e.g., a hard disk, a flash drive) and/or non-persistent (e.g., RAM) components. In the example implementation illustrated in FIG. 1, the memory 24 stores instructions that implement a navigation application 26.

Further, the mobile system 12 further includes a user interface 28 and a network interface 30. Depending on the scenario, the user interface 28 can correspond to the user interface of the portable electronic device or the user interface of the vehicle. In either case, the user interface 28 can include one or more input components such as a touchscreen, a microphone, a keyboard, etc. as well as one or more output components such as a screen or speaker.

The network interface 30 can support short-range and/or long-range communications. For example, the network interface 30 can support cellular communications, personal area network protocols such as IEEE 802.11 (e.g., Wi-Fi) or 802.15 (Bluetooth). In some implementations, the mobile system 12 includes multiple network interface modules to interconnect multiple devices within the mobile system 12 and to connect the mobile system 12 to the network 16. For example, the mobile system 12 can include a smartphone, the head unit of a vehicle, and a camera mounted on the windshield. The smartphone and the head unit can communicate using Bluetooth, the smartphone and the camera can communicate using USB, and the smartphone can communicate with the server 14 via the network 16 using a 4G cellular service, to pass information to and from various components of the mobile system 16.

Further, the network interface 30 in some cases can support geopositioning. For example, the network interface 30 can support Wi-Fi trilateration. In other cases, the mobile system 12 can include a dedicated positioning module 32 such as a Global Positioning Service (GPS) module. In general, the mobile system 12 can include various additional components, including redundant components such as positioning modules implemented both in the vehicle and in the smartphone.

With continued reference to FIG. 1, the mobile system 12 can communicate with the server system 14 via the network 16, which can be a wide-area network such as the Internet. The server system 14 can be implemented in one or more server devices, including devices distributed over multiple geographic locations. The server system 14 can implement a routing engine 40, a navigation instructions generator 42, and a visual landmark selection module 44. The components 40-44 can be implemented using any suitable combination of hardware, firmware, and software. The server system 15 can access databases such as a map database 50, a visual landmark database 52, and a user profile database 54, which can be implemented using any suitable data storage and access techniques.

In operation, the routing engine 40 can receive a request for navigation directions from the mobile system 12. The request can include a source, a destination, and constraints such as a request to avoid toll roads, for example. The routing engine 40 can retrieve road geometry data, road and intersection restrictions (e.g., one-way, no left turn), road type data (e.g., highway, local road), speed limit data, etc. from the map database 50 to generate a route from the source to the destination. In some implementations, the routing engine 40 also obtains live traffic data when selecting the best route. In addition to the best, or "primary," route, the routing engine 40 can generate one or several alternate routes.

In addition to road data, the map database 50 can store descriptions of geometry and location indications for various natural geographic features such as rivers, mountains, and forests, as well as artificial geographic features such buildings and parks. The map data can include, among other data, vector graphics data, raster image data, and text data. In an example implementation, the map database 50 organizes map data into map tiles, which generally correspond to a two-dimensional organization of geospatial data into traversable data structure such as a quadtree.

The navigation instructions generator 42 can use the one or more routes generated by the routing engine 40 and generate a sequence of navigation instructions. Examples of navigation instructions include "in 500 feet, turn right on Elm St." and "continue straight for four miles." The navigation instructions generator 42 can implement natural language generation techniques to construct these and similar phrases, in the language of the driver associated with the mobile system 12. The instructions can include text, audio, or both.

The visual landmark selection module 44 operates as part of the landmark selection system 18, which also includes the navigation application 26. The visual landmark selection module 44 can augment the navigation directions generated by the navigation instructions generator 42 with references to visual landmarks such as prominent buildings, billboards, traffic lights, stop signs, statues and monuments, and symbols representing businesses. To this end, the visual landmark selection module 44 initially can access the visual landmark database 52 to select a set of visual landmarks disposed along the navigation route. However, as discussed in more detail below, the landmark selection system 18 then can select a subset of these visual landmarks in accordance with the likelihood the driver can actually see the landmarks when driving, and/or dynamically identify visual landmarks that were not previously stored in the visual landmark database 52.

The visual landmark database 52 can store information regarding prominent geographic entities that can be visible when driving (or bicycling, walking, or otherwise moving along a navigation route) and thus serve as visual landmarks. For each visual landmark, the visual landmark database 52 can store one or several photographs, geographic coordinates, a textual description, remarks submitted by users, and numeric metrics indicative of usefulness of the visual landmark and/or of a particular image of the visual landmark. In some implementations, a landmark-specific record in the visual landmark database 52 stores multiple views of the visual landmark from the same vantage point, i.e., captured from the same location and with the same orientation of the camera. However, the multiple views of the visual landmark can differ according to the time of day, weather conditions, season, etc. The data record can include metadata that specifies these parameters for each image. For example, the data record may include a photograph of a billboard at night when it is illuminated along with a timestamp indicating when the photograph was captured and another photograph of the billboard at daytime from the same vantage point along with the corresponding timestamp. Further, the data record may include photographs of the billboard captured during snowy weather, during rainy weather, during foggy weather, etc., and corresponding indicators for each photograph. Still further, the data record may include photographs captured during different seasons.

In short, the visual landmark database 52 can store a large set of visual landmarks that in some cases is redundant both in terms of the number of landmarks available for the same maneuver (e.g., a billboard on the right and a church on the left near the same intersection) and in terms of imagery available for the same landmark. The landmark selection system 18 can determine which of the redundant landmarks are useful for particular lighting conditions, weather conditions, traffic conditions (as drivers may find it difficult to recognize certain visual landmarks when driving fast), and how well the corresponding scene is visible from the driver's vantage point (as inferred from real-time imagery).

In addition to multiple images of a same visual landmark, the visual landmark database 52 can store multiple descriptions of the same landmark, such as "the large glass building," "the building with a large 'M' in front of it," "the building with international flags," etc. Operators of the server system 14 and/or users submitting landmark information as part of a crowd-sourcing effort can submit these descriptions, and the server system 14 can determine which description drivers find more helpful using the feedback processing techniques discussed in more detail below. To keep track of drivers' feedback, the visual landmark database 52 in one example implementation stores an overall numeric metric for a visual landmark that can be used to assess whether the visual landmark should be referenced in navigation directions at all, separate numeric metrics for different times of day, different weather conditions, etc. and/or separate numeric metrics for different images.

To populate the visual landmark database 52, the server system 14 can receive satellite imagery, photographs and videos submitted by various users, street-level imagery collected by cars equipped with specialized panoramic cameras, street and sidewalk imagery collected by pedestrians and bicyclists, etc. Similarly, the visual landmark database 52 can receive descriptions of landmarks from various sources such as operators of the server system 14 and people submitting user-generated content.

With continued reference to FIG. 1, the user profile database 54 can store user preferences regarding the types of visual landmarks they prefer to see. For example, the profile of a certain user can indicate that she prefers billboards as landmarks. The landmark selection system 18 can use user preferences as at least one of the factors when selecting visual landmarks from among redundant visual landmarks. In some implementations, the user provides an indication that he or she allows the landmark selection system 18 may utilize this data.

In operation, the camera 20 can capture a scene 60 as a still photograph or a frame in a video feed. The scene 60 approximately corresponds to what the driver of the vehicle operating in the mobile system 12 currently sees. Based on the captured scene 60, the landmark selection system 18 can determine that the driver can clearly see the landmark stadium depicted in a pre-stored image 70, but that the landmark building depicted in a pre-stored image 72 is largely obscured. The better visibility of the landmark stadium is at least one of the signals the landmark selection system 18 can use to determine whether to reference the landmark stadium, the landmark building, or both.

As indicated above, functionality of the landmark selection system 18 can be distributed between the mobile system 12 and the server system 14 in any suitable manner. In some implementations, for example, the processing capability of the mobile system 12 is insufficiently robust to implement image processing. The mobile system 12 accordingly can capture photographs and/or video and provide the captured imagery to the server system 14, where the visual landmark selection module executes a video processing pipeline. In other implementations, the mobile system 12 has sufficient processing capability to implement image matching. The server system 14 in this case can provide relevant visual landmark imagery such as the images 70 and 72 to the mobile system 12, and the navigation application 26 can compare the scene 60 to the images 70 and 72 to detect probable matches. In yet other implementations, the mobile system 12 implements a less constrained image processing pipeline and attempts to automatically recognize in the scene 60 objects of certain pre-defined types such as people, small cars, large cars, trucks, traffic lights, billboards, etc.

Next, example methods for generating navigation directions using real-time imagery and for adjusting visual landmark metrics are discussed with reference to FIGS. 2 and 3, respectively, followed by a discussion of example image processing techniques that can be implemented in the system of FIG. 1. Other techniques for selecting visual landmarks from a large, redundant pre-stored set or recognizing visual landmarks currently absent from the pre-stored set are then discussed with reference to the remaining drawings.

Example Methods for Providing Navigation
Directions Using Real-Time Imagery

In an example scenario, a driver request launches a navigation application on her smartphone and requests driving directions to her friends' home. She connects her smartphone to the camera mounted on the windshield of her car and starts driving. As she drives through a busy part of town and approaches the intersection where she must turn left, three objects potentially could serve as visual landmarks: a fast-food restaurant with an easily recognizable logo on the right, a bus stop shelter on the left, and a distinctive building on the left just past the intersection. The scene as captured by the driver's camera indicates that while bus stop shelter is visible, the fast-food restaurant and the distinctive building are obscured by trees. The navigation application accordingly generates the audio message "turn left at the bus stop you will see on your left" when the driver is approximately 200 feet away from the intersection.

Figure 2:
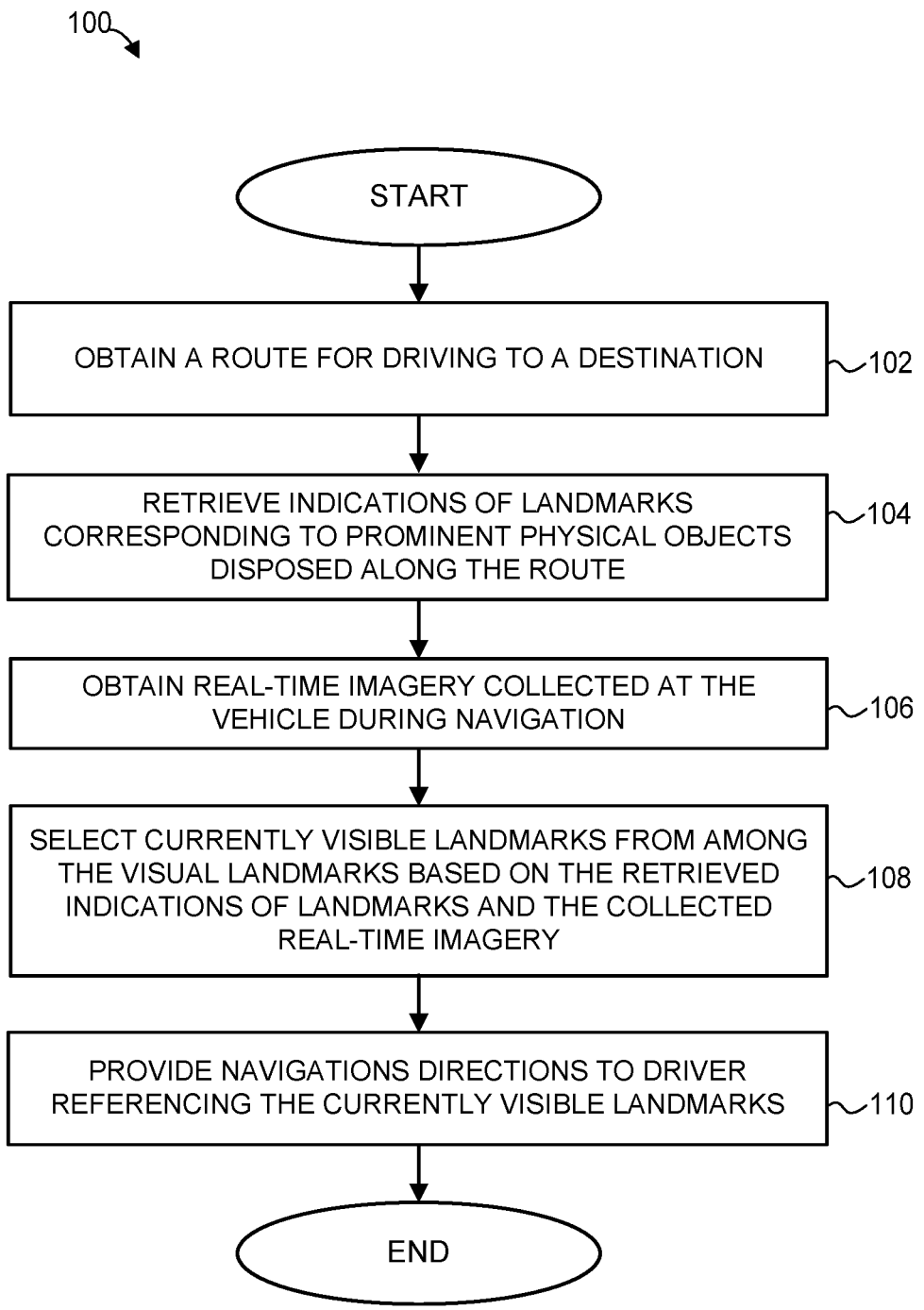
FIG. 2 is a flow diagram of an example method for generating navigation directions for drivers using real-time imagery, which can be implemented in the system of FIG. 1.
Figure 3:
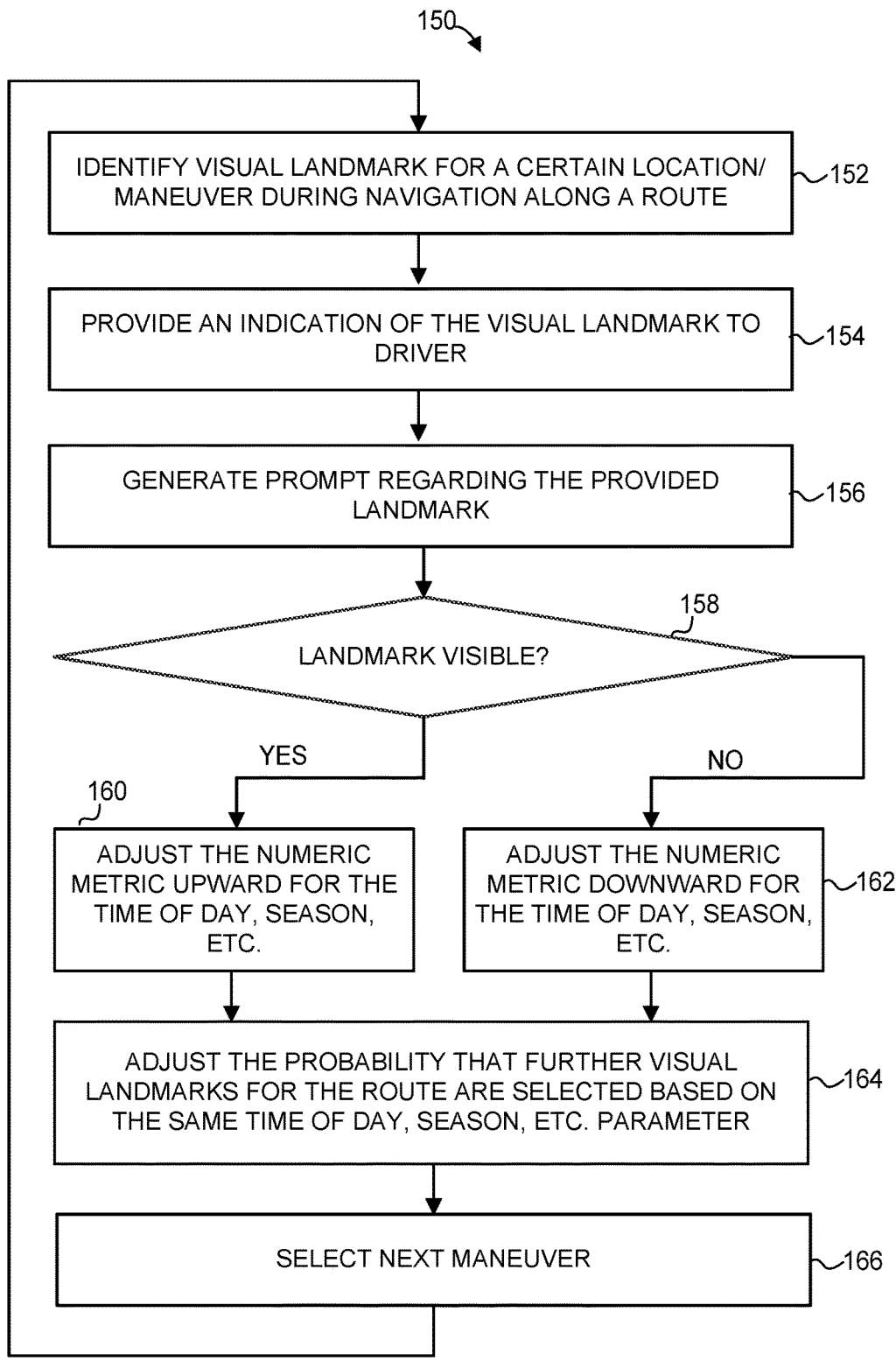
FIG. 3 is a flow diagram of an example method for adjusting numeric metrics of landmark prominence based on user feedback, which can be implemented in the system of FIG. 1.

FIG. 2 is a flow diagram of an example method 100 for generating navigation directions for drivers using real-time imagery as discussed in the example above. The method 100 can be implemented in the landmark selection system 18 of FIG. 1 or in another suitable system. The method 100 can be implemented as a set of software instructions stored on a non-transitory computer-readable medium and executable by one or more processors, for example.

The method 100 begins at block 102, where a route for driving to a certain destination from the current location of the user or from some other location is obtained. At block 104, indications of landmarks corresponding to prominent physical objects disposed along the route are retrieved. Each indication can include the coordinates of the corresponding visual landmark and the corresponding pre-stored imagery (e.g., photographs or a video sequence of a short fixed duration). Depending on the implementation, visual landmarks can be retrieved for the entire route or for a portion of the route, e.g., for the current location of the user. In a sense, these visual landmarks are only candidate visual landmarks for the current navigation sessions, and it can be determined that some or all of these visual landmarks are not visible (or, as discussed above, some currently visible visual landmarks may not be selected when better candidates are available).

At block 106, real-time imagery is collected at the vehicle approximately from the vantage point of the driver. The real-time imagery can be one or several still photographs defining a scene. For some image processing techniques, feature comparison or recognition is more reliable when a video stream rather than a single photograph is available, and thus the real-time imagery defining the scene also can be a video feed of a certain duration (e.g., 0.5 sec).

The real-time imagery of the scene then is processed at block 108. To this end, the collected real-time imagery then can be uploaded to a network server. Alternatively, the real-time imagery can be processed at a mobile system such as the user's smartphone or the head unit of the vehicle. For example, the mobile system 12 can receive a representative image of a visual landmark and locally process the real-time imagery using the processing module 22 whether this candidate visual landmark is visible in the real-time imagery. As yet another alternative, processing of the real-time imagery can be distributed between the mobile system and the server system. The processing at block 108 can include comparing the captured scene to the pre-stored imagery of the landmarks obtained at block 106. The processing can produce an indication of which of the visual landmarks identified at block 104 can be identified in the captured scene, and thus probably are visible to the driver.

At block 110, navigation directions referencing the one or more visible visual landmarks are provided to the driver, whereas the visual landmarks identified at block 104 but not located within the scene captured at block 106 are omitted. The instructions can include text to be displayed on the driver's smartphone or projected via the head unit and/or audio announcements, for example. Additionally, a pre-stored image of a visual landmark referenced in the directions can be downloaded from the visual landmark database 52 to the mobile system 12 and displayed in the projected mode on the head unit of the vehicle, so that the user can glance at the display and see to which visual landmark the directions refer.

The method 100 completes after block 110. Thus, in a sense, the system implementing the method 100 uses real-time imagery as a filter applied to the redundant set of visual landmarks. Of course, if more than the necessary number of visual landmarks (typically one) are determined to be visible for a single maneuver, the visual landmarks can be further filtered based on other signals. Some of these signals, including the signals based on user feedback, are discussed below.

Example Methods for Collecting and Utilizing Driver Feedback

Referring back to FIG. 1, after the landmark selection system 18 determines that the landmark of the image 70 is probably visible to the driver and that the landmark of the image 72 is probably not visible to the driver, and accordingly references the landmark of the image 70 in the navigation directions, the driver can provide an indication of whether the landmark of the image 70 was in fact helpful. Further, the landmark selection system 18 in some cases is not equipped with the camera 20 or fails to obtain real-time imagery at the vehicle for some reason (the landmark selection system 18 then can select the visual landmarks based on other signals). In these cases, the driver still can provide feedback regarding the quality of the visual landmarks referenced in the navigation directions. In other words, the landmark selection system 18 can collect driver feedback regardless of its capacity to process real-time imagery.

Now referring to FIG. 3, an example method 150 for requesting and processing user feedback is discussed below with reference to the landmark selection system 18, in which it can be implemented. However, the method 150 in general can be implemented in any suitable system, including navigation systems that receive navigation directions via a network connection, navigation systems built into vehicles and storing landmark data along with map data on a hard disk or other storage device, standalone navigation systems with pre-stored landmark and map databases, etc. It is noted further that the method 150 can be implemented in systems configured to receive real-time imagery as well as systems that are not configured to receive real-time imagery.

The method 150 begins at block 152. Here, the landmark selection system 18 can select a visual landmark for a certain location and maneuver, during navigation. Next, the landmark selection system 18 can provide an indication of the visual landmark to the driver at block 154, and provide a prompt regarding this visual landmark at block 156 so as to assess the quality of the suggestion. For example, the indication can be "after you pass the statue of a bull, turn right on Financial Pl." To obtain explicit user feedback after the user completes the maneuver by turning right, the follow-up yes/no prompt at block 156 can be "did you see the statue of a bull?" In some implementations, the landmark selection system 18 does not generate a follow-up prompt every time the visual landmark is referenced but rather at a certain relatively low rate, such as once per hundred references to the visual landmarks. Additionally or alternatively, the landmark selection system 18 can collect implicit user feedback by determining whether the user successfully completed the maneuver or missed the turn. Thus, if the prompt above is provided to one hundred drivers over a certain period of time, and only 85% the drivers turn right on Financial Pl. (while the overall success rate for maneuvers specified in the navigation directions and augmented by references to visual landmarks is 99%, for example), it is probable that the statue of a bull is not a good visual landmark. The landmark selection system 18 can utilize any suitable statistical technique to assess the probability of recognizing visual landmarks.

Further, because some users may dislike any follow-up prompts, the landmark selection system 18 can format the reference to the visual landmark at block 154 as a question. Thus, for example, the navigation application can generate the question "do you see the statue of a bull on your right?" If the driver answers in the affirmative, the landmark selection system 18 can immediately provide the complete instruction "after you pass the statue of a bull, turn right on Financial Pl." Otherwise, the landmark selection system 18 can select the next visual landmark, when available, and generate the next question.

If it is determined at block 158 that the user can see the visual landmark, the flow proceeds to block 160. Otherwise, the flow proceeds to block 162. At block 160, the landmark selection system 18 can adjust the numeric metric for the visual landmark upward to indicate an instance of success. On the other hand, at block 162 the landmark selection system 18 can adjust the numeric metric for the visual landmark downward to indicate an instance of failure. Further, depending on the implementation, the landmark selection system 18 can adjust the metric for a particular time of day, particular weather, particular season, particular lighting conditions, etc.

At block 164, the landmark selection system 18 can also adjust the probability of selecting other landmarks that belong to the same type (or images of landmarks of a certain type). For example, if it determined at block 158 that the driver found a certain billboard to be a useful landmark, the probability of preferring billboards to other types of landmarks can increase. After block 164, the flow proceeds to block 166, where the next maneuver is selected. The flow then returns to block 152, where a set of visual landmarks is selected for the new maneuver and the location of the driver.

Thus, when a redundant set of visual landmarks is available, the landmark selection system 18 can utilize explicit and/or implicit driver feedback to determine which visual landmarks are more likely to be useful for the remainder of the navigation session, and which visual landmarks are likely to be useful to other drivers in the future. The overall accuracy of assessing usefulness of visual landmarks is expected to increase when the method 150 is executed for a large number of navigation sessions, and for a large number of drivers.

In some cases, the method 150 can be extended to other types of navigation directions or geographic suggestions. For example, a navigation system can use the method 150 to determine whether a certain reference to a street name is a reliable reference in navigation directions. Because street signs may be missing or poorly lit, and because some street and road information may be out of date, the navigation system can format certain directions as questions (e.g., "Do you see Elm St. 300 feet ahead?"), receive explicit feedback when the user chooses to comment on the previously provided directions (e.g., "In 300 feet, turn right on Elm St."—"I cannot see Elm St."), and/or collect implicit feedback (e.g., missed turn, sudden deceleration prior to the turn).

Further, in a generally similar manner, the devices illustrated in FIG. 1 can use explicit and implicit driver feedback to identify easy-to-miss turns. For both "traditional" navigation directions and landmark-based navigation directions, the server system 14 can detect the tendencies of drivers to miss turns, quickly brake before upcoming turns, or otherwise not maneuver according to the instructions provided as part of the navigation directions. For example, if a certain percentage of the drivers miss the turn or appear to almost miss the term by quickly changing their speed, the server system 14 can determine that the turn is an easy-to-miss turn. As discussed above, this percentage also can mean that the visual landmark referenced in the corresponding instruction may not be reliable. In addition to determining that a new visual landmark may be need for this location, the navigation instruction generator 42 can automatically provide a warning to the driver, such as "slow down here, the next turn is easy to miss." Further, the difficulty of the maneuver may indicate to the landmark selection system 18 that it should attempt to identify a suitable dynamic visual landmark, especially when no permanent visual landmarks are available. Dynamic visual landmarks are discussed in more detail below.

Example Image Processing Techniques

In some implementations, the landmark selection system 18 compares the captured real-time imagery to pre-stored images to detect a match or absence of a match. As a more specific example, the visual landmark database 52 of FIG. 1 can store images of the landmark depicted in the image 70 captured from various locations and with various orientations of the camera, i.e., camera poses. These images can be, for example, street-level images collected by a specialized vehicle and annotated to select only those pixels or portions of each image that depict the visual landmark. The annotation may be conducted manually, for example.

As the camera 20 captures the scene 60, a positioning module operating in the mobile system 12 determines the location from which the scene 60 was captured. The landmark selection system 18 then can retrieve those images of the landmarks depicted in the images 70 and 72 that match the pose of the camera 20 at the time of capture. Thus, the visual landmark database 52 can store numerous photographs of the stadium depicted in FIG. 1, and the landmark selection system 18 can select one or several photographs from among these numerous photographs based on the camera pose and then determine whether the stadium is depicted in the scene 60. According to this approach, the landmark selection system 18 seeks to determine the presence or absence of a specified visual landmark.

Figure 4:
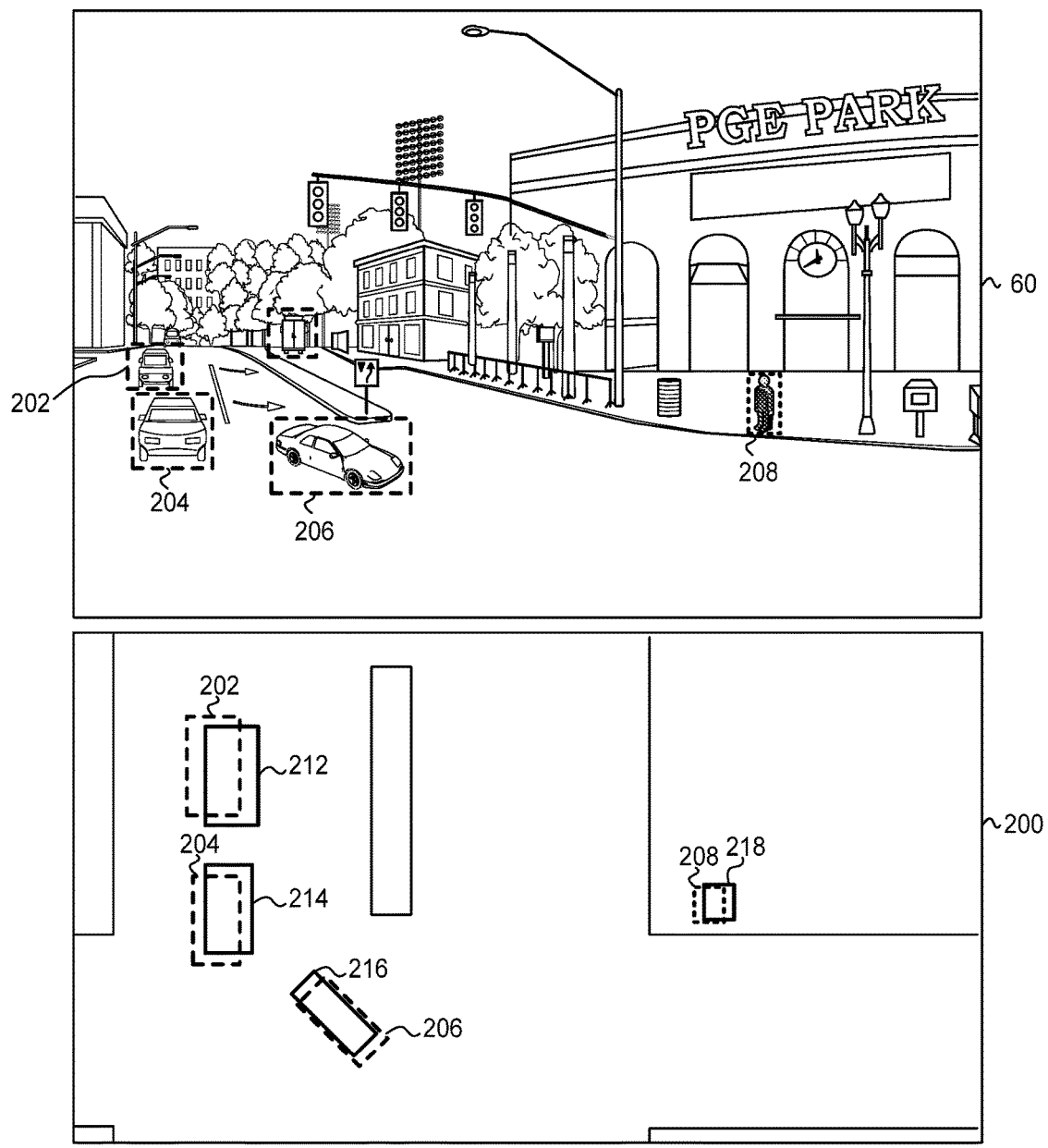
FIG. 4 is a block diagram that illustrates semantic segmentation of a scene and detecting poses of objects using a machine learning model, which can be implemented in the system of FIG. 1.

In another implementation, the landmark selection system 18 implements less constrained image processing. FIG. 4 illustrates the scene 60 along with a model 200 that positions automatically recognized entities such as cars and people in two- or three-dimensional space. The landmark selection system 18 can rely on models of certain types or classes of objects to identify presence or absence of objects of these types in the scene 60 using a deep-learning technique such as building a convolutional neural network (CNN), for example. Experiments have shown that these techniques can spatially localize hundreds of classes of objects, in relatively short time (e.g., 100 ms per image). The CNN can be trained using such datasets annotated with metadata as, for example, CityScapes available at www.cityscapes-dataset.com.

In the example scenario of FIG. 4, the landmark selection system 18 generates bounding boxes 202, 204, 206 and 208 with respective confidence scores. The bounding boxes 202, 204 and 206 correspond to vehicles of respective types, and the bounding box 208 corresponds to a standing person. The landmark selection system 18 then places the identified objects within the geographic model 200 of the corresponding area. Moreover, the landmark selection system 18 can determine the spatial orientation of these objects. The bounding boxes 212-218 enclose models of the corresponding object types. For example, the bounding box 212 encloses a sample object of type "sports utility vehicle," the bounding box 214 encloses a sample object of type "midsize car," the bounding box 216 encloses a sample object of type "sports car," and bounding box 218 encloses a sample object of type "standing adult person." Other examples of types of objects can include bicycles, buses, billboards, traffic lights, certain chain store logos, etc. The landmark selection system 18 can align the objects identified in the scene 60 with these and other types of objects and determines the positions of these objects relative to static geographic features such as buildings with known coordinates, etc. In this manner, the landmark selection system 18 can describe the position of an identified object relative to static geographic features and generate navigation instructions of the type "turn where the sports car is now turning."

The landmark selection system 18 also can process color characteristics of the identified objects. Thus, the instruction above can become "turn where the red sports car is now turning," which may be more helpful to the driver. Further, the landmark selection system 18 can be configured to recognize alphanumeric characters and generate such instructions as "keep going past the sign that says 'car wash,'" when the camera captures an image of a person holding up a temporary car wish sign.

In some implementations, the landmark selection system 18 labels every pixel in the scene 60 in accordance with semantic segmentation techniques. For the example scene 60, semantic segmentation can produce an indication of where the sidewalk, the road, and the trees are located. A more robust image processing pipeline generally is required to conduct semantic segmentation, but using semantic segmentation the landmark selection system 18 can identify additional landmarks and/or generate better explanations of where visual landmarks are located. For example, the navigation instruction "turn right after you see a large yellow billboard" can be improved to "turn right after you see a large yellow billboard on the sidewalk."

Dynamically Identifying Visual Landmarks

Referring back to FIG. 1, the landmark selection system 18 can use the image processing techniques discussed above both to determine the presence or absence of pre-selected objects in captured real-time imagery and to dynamically identify objects in the real-time imagery that can work as visual landmarks, even where no information for such objects was stored in the visual landmarks database 52. These dynamic visual landmarks typically are transient (e.g., a bus stopped at the corner, a truck parked in front of a convenience store, a bicyclist in a yellow shirt turning left), in which case the landmark selection system 18 can limit the use of these dynamic visual landmarks to the current navigation instructions only. However, the landmark selection system 18 in a similar fashion can identify new permanent landmarks that were missing from the visual landmark database 52. For example, no information about a recently installed billboard may be stored in the visual landmark database 52, and the landmark selection system 18 in some cases can identify a potentially permanent landmark and automatically submit the corresponding image to the server system 14, which in response may create a new record in the visual landmark database 52.

Figure 5:
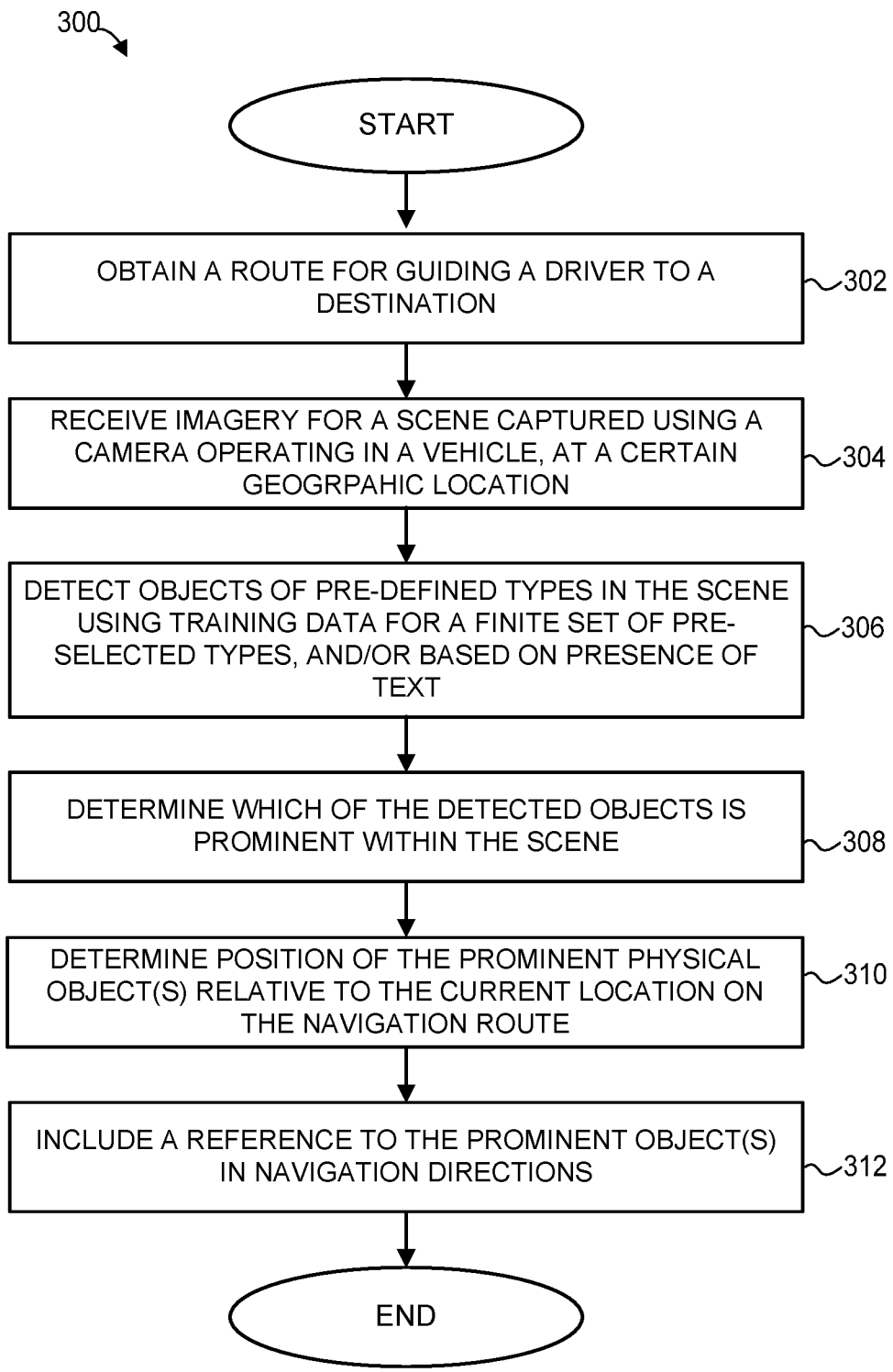
FIG. 5 is a flow diagram of an example method for generating navigation directions that include a reference to a physical object not included in the original navigation directions.

Next, FIG. 5 illustrates an example method 300 for identifying prominent objects within a captured scene, which can be implemented in the system of FIG. 1. For convenience, the method 300 is discussed with reference to landmark selection system 18, but it is noted that the method 300 can be implemented in any suitable system.

At block 302, the landmark selection system 18 can determine a route for guiding a driver to a destination. The route can include a graph traversing several road segments, and the corresponding navigation directions can include a sequence of descriptions of maneuvers. In some implementations, the navigation directions can be generated at the server system 14 and provided to the mobile system 12 in relevant portions.

Next, at block 304, the landmark selection system 18 can receive real-time imagery for a scene, collected at a certain location of the vehicle. Typically but not necessarily, the real-time imagery is collected when the vehicle approaches the location of the next maneuver. The camera pose for the captured imagery approximately corresponds to the vantage point of the driver. When geo-positioning is available, the real-time imagery can be geographically tagged, i.e., include an indication of the location where the real-time imagery was captured.

At block 306, the landmark selection system 18 can identify objects of certain pre-defined types within the captured scene. As discussed above, this identification can be based on training data and can include semantic image segmentation. In some cases, the identification is based on the presence of letters, numbers, and other alphanumeric characters. To this end, the landmark selection system 18 can implement any suitable character recognition technique. Moreover, the landmark selection system 18 may implement both object identification and character recognition to identify objects of pre-defined types with alphanumeric characters.

At block 308, the landmark selection system 18 can determine which of the detected objects appear prominently within the scene. Referring back to FIG. 4, not every object within the bounding boxes 202-208 is necessarily noticeable to a human observer. In other words, to generate useful dynamic visual landmarks, it is often insufficient for the landmark selection system 18 to simply identify objects. The landmark selection system 18 accordingly can assess the prominent of visual landmarks relative to the rest of the scene based on the difference in color, for example. More particularly, the landmark selection system 18 can determine that the car enclosed by the box 206 is bright red, and that the rest of the scene 60 lacks bright patches of color. The car enclosed by the box 206 thus can be determined to be a potentially useful visual landmark. As another example, the landmark selection system 18 can identify several buildings within a scene, determine that the buildings are disposed at a similar distance from vehicle, and determine that one of the buildings is significantly larger than the other buildings. In addition to color and size, the landmark selection system 18 can use any number of suitable criteria of prominence, such as shape, presence of alphanumeric characters, etc.

At block 310, the landmark selection system 18 can determine the positions of the one or more prominent objects relative to the current location of the vehicle and/or to the locations of road intersections and other geographic waypoints, in a two- or may three-dimensional coordinate system. Where relevant, the landmark selection system 18 also determine the orientation of the prominent object. Referring back to FIG. 4, after the sports car enclosed by the box 206 is identified as a prominent feature, the landmark selection system 18 can determine the location and orientation of the sports car relative to the streets.

At block 312, the landmark selection system 18 can include in the navigation directions a reference to the one or more prominent objects identified at block 306. As discussed above, the landmark selection system 18 can generate such instructions as "turn left on Main. St., where the red sports car is turning" or "turn right on Central St. after the blue billboard." The instructions can include any suitable combination of text and multimedia.

Modifying Navigation Route using Live States of Traffic Lights

Figure 6:
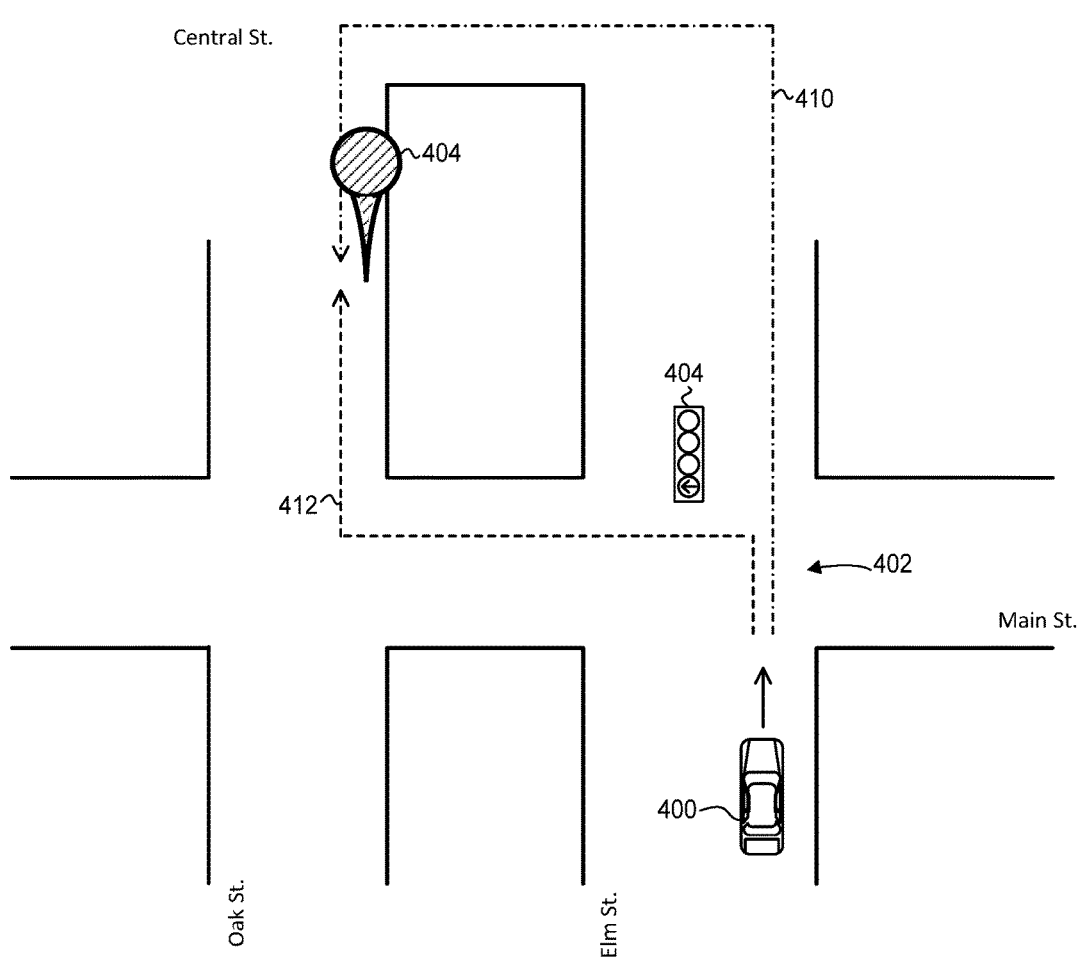
FIG. 6 is a block diagram that schematically illustrates two routing options for reaching a final or intermediate destination, from which the system of FIG. 1 selects in view of the live state of the traffic light, according to one implementation.

In the scenario schematically illustrated in FIG. 6, the car 400 approaches an intersection 402 via Elm St., en route to a destination or intermediate waypoint 404. From the intersection 402, there are two viable route options: one could continue driving down Elm St. past the intersection 402, turn left on Central St., and then left again on Oak St. (route 410).

Alternatively, one could turn left on Main St. at the intersection 402 and then turn right on Oak St. (route 412). A traffic light 404 includes a left-turn arrow indicator.

Prior to the car 400 reaching the intersection 402, the routing engine 40 (see FIG. 1) may have determined that the route 410 is faster that the route 412. For example, the routing engine 40 may have applied routing algorithms based on graph theory and additionally considered live traffic data for the potentially relevant portions of the route. However, as the camera operating in the car 400 captures a scene that includes the traffic light 404, the landmark selection system 18 can analyze the scene to a identify and properly classify a visual landmark, the traffic light 404. The landmark selection system 18 can determine that the traffic light 404 is currently displaying a green arrow, and in response the routing engine 40 can re-evaluate the routing options and determine that the route 412 has become a better option. In this case, the navigation instructions generator can provide an updated notification advising the driver to turn left at the intersection 402. On the other hand, if the landmark selection system 18 analyzes the scene to determine that the traffic light 404 is green, the routing engine 40 can confirm that the route 410 remains the better option. It is noted that in many cases, the current state of a traffic light cannot be obtained from other sources such as real-time database servers, or can be obtained with such difficulties that the approach becomes impractical.

Figure 7:
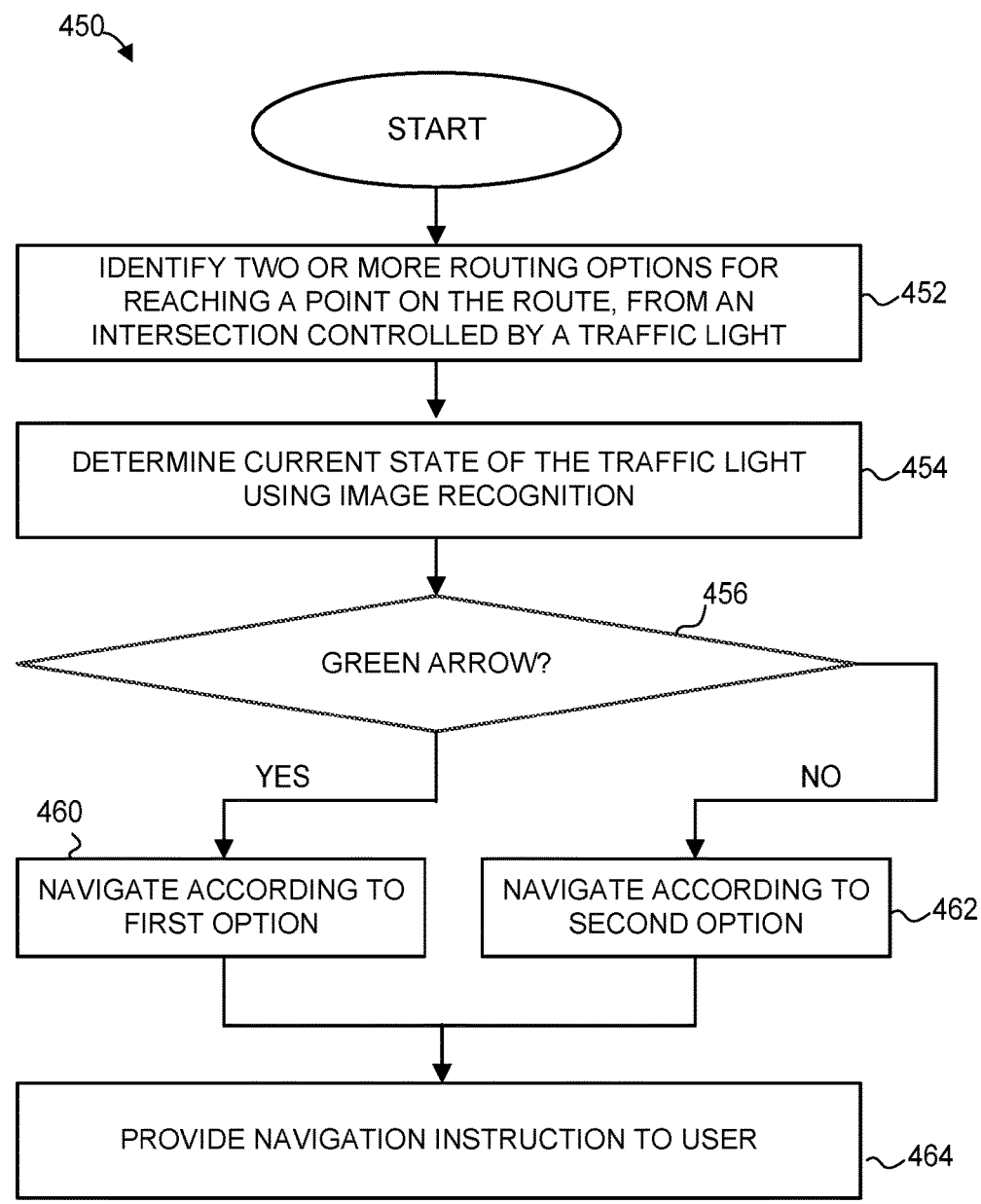
FIG. 7 is a flow diagram of an example method for selecting a navigation option in view of the live state of a traffic signal, which can be implemented in the system of FIG. 1.

FIG. 7 depicts a flow diagram of an example method 450 for selecting a navigation option in view of the live state of a traffic signal, which can be implemented in the devices illustrated in FIG. 1 or any other suitable system.

The method 450 begins at block 452, where two or more routing options for reaching a certain intermediate point along the route or the endpoint of the route, from a certain location controlled by a traffic light, are identified. At block 454, the current state of the traffic light is determined using real-time imagery captured at the vehicle approaching the location. If the traffic light is determined to be displaying the green arrow, the flow proceeds to block 460, where the first routing option is selected. Otherwise, if the traffic light is determined to not be displaying the green arrow, the flow proceeds to block 462, and the second routing option is selected. The corresponding navigation instruction then is provided to the user at block 464.

Using Real Time Imagery for Lane Guidance and Improving Positioning

In some implementations, the components of the landmark selection system 18 can use real-time imagery to improve lane guidance. In general, positioning solutions such as GPS or Wi-Fi triangulation cannot yield a position fix precise enough to determine in which lane the vehicle is currently located. Using the techniques discussed above and/or other suitable techniques, the landmark selection system 18 can recognize lane marking (e.g., white and yellow divider strips), arrows and highway signs painted on the road, the dimensionality of lanes based on detected boundaries of the sidewalk, presence of other vehicles from which the existence of other lanes can be inferred, etc.

For example, the camera 20 of FIG. 1 can be positioned so as to capture the road immediately ahead of the vehicle. The captured imagery can include a first solid single white line on the left, a solid double yellow line in the to the right to the first white line, a dashed white line to right of the solid yellow line, and a second single white line on the right. The navigation application 26 can process the imagery (locally or by uploading the imagery to the sever system 14) to determine, using the knowledge that the vehicle currently is in a geographic region where people drive on the right, that the road includes two lanes in the current direction of travel and one lane in the opposite direction. The navigation application 26 then can process the geometry of the detected lines to determine the current position of the vehicle relative to the lanes. To this end, the camera 20 may be mounted at a certain precise location, so that the navigation application 26 can account for the geometry of the vehicle (e.g., the navigation application 26 may be provisioned to assume that the camera two feet above ground level, 30 inches away from the left edge of the vehicle and 40 inches away from the right edge of the vehicle). Additionally or alternatively, the camera 20 may be mounted so as to capture the front exterior corners of the vehicle to determine where the corners are located relative to the white and yellow lines on the road.

Using lane recognition, the navigation application 26 can provide lane-specific guidance. For example, the navigation application 26 can guide the driver to avoid left-turn-only or right-turn-only lanes when the vehicle needs to travel straight, generate more relevant warnings regarding merging left or right, warn the driver when he or she is in a lane that is about to end, etc.

In some implementations, the navigation application 26 and/or the navigation instructions generator 42 can also use lane data available in the map database 50. For example, the navigation application 26 can receive an indication that the vehicle is currently traveling in a three-lane road segment, based on the most recent GPS or Wi-Fi positioning fix. Using this information along with real-time imagery, the navigation application 26 can determine in which lane the vehicle is travelling and generate appropriate instructions when necessary.

Generating Warnings about Potential Traffic Violations Using Real Time Imagery

Further, the navigation application 26 can use the imagery captured by the camera 20 to automatically generate warnings regarding potential traffic violations. For example, drivers have been observed making an illegal right-on-red turn onto Shoreline Blvd. from US 101 North in Mountain View, Calif. It is believed that many drivers simply do not notice the "no right on red" sign. While the map database 50 can store an indication that the right turn on red is not allowed at this road junction, preemptively generating a warning whenever the driver is about to turn onto Shoreline Blvd. can be distracting and unnecessary, as the driver may be turning right on green.

Accordingly, the landmark selection system 18 can process the state of the traffic light as discussed above when the driver enters the ramp. When the state of the traffic light is determined to be red, and when the driver appears to start moving based on the positioning data or vehicle sensor data, the landmark selection system 18 can automatically provide an instruction "no right no red here!," for example. To determine whether such an instruction should be provided, the landmark selection system 18 also can consider statistical indicators for the road junction, when available. For example, an operator can manually provision the server system 14 with an indication that this particular Shoreline Blvd exit is associated with frequent traffic violations. These indications also can be user-generated.

In some embodiments, the landmark selection system 18 also can process and interpret the "no right on red" sign prior to generating the warning. In particular, the map database 50 may not have specific turn restriction data for a certain residential area.

Additional Considerations

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

Upon reading this disclosure, those of ordinary skill in the art will appreciate still additional alternative structural and functional designs for the systems for using real-time imagery and/or driver feedback in navigation. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating navigation directions for drivers, the method comprising:
    obtaining, by one or more processors, a route for guiding a driver of a vehicle to a destination;
    retrieving, by the one or more processors from a database, a plurality of visual landmarks corresponding to prominent physical objects disposed along the route;
    retrieving, by the one or more processors, a video feed from a camera mounted in the vehicle to obtain real-time imagery during navigation along the route;
    using (i) the retrieved plurality of visual landmarks and (ii) the imagery collected at the vehicle, selecting, by the one or more processors, a subset of the plurality of visual landmarks that are currently visible to the driver;
    providing, to the driver, navigation directions describing the route, the navigation directions referencing the selected subset of the plurality of visual landmarks and excluding remaining ones of the plurality of visual landmarks;
    obtaining, by the one or more processors, an indication that the driver cannot see a visual landmark included in the subset of the plurality of visual landmarks; and
    in response to the indication, updating in the database a numeric metric indicative of how often users find the visual landmark useful, wherein the numeric metric is used to select visual landmarks corresponding to prominent physical objects disposed along the route.

2. The method of claim 1, wherein retrieving the plurality of visual landmarks includes retrieving an image of a physical object and an indication of a geographic location of the physical object, and wherein selecting the subset of the plurality of visual landmarks includes processing real-time imagery collected near the geographic location to determine whether the real-time imagery depicts the physical object.

3. The method of claim 1, further comprising processing, by the one or more processors, the imagery collected at the vehicle using a convolutional neural network with semantic segmentation.

4. The method of claim 3, further comprising:
    identifying a physical object of a certain predetermined class within a scene of the real-time imagery, using the convolutional neural network; and
    comparing at least one of a size or a color of the physical object to the scene to determine whether the physical object is more prominent than other physical objects in the scene.

5. The method of claim 1, further comprising determining lighting conditions at a current location of the vehicle, and wherein retrieving the plurality of visual landmarks includes querying the database for visual landmarks previously labeled as being suitable for the determined lighting conditions.

6. The method of claim 1, further comprising determining weather conditions at a current location of the vehicle, and wherein retrieving the plurality of visual landmarks includes querying the database for visual landmarks previously labeled as being suitable for the determined weather conditions.

7. The method of claim 1, further comprising:
    prior to retrieving the plurality of visual landmarks, obtaining a selection of a type of a visual landmark, the type corresponding to one of time of day or a season.

8. The method of claim 1, wherein retrieving the plurality of visual landmarks includes querying the database for visual landmarks based on a profile of the driver.

9. The method of claim 1, further comprising identifying, using the real-time imagery, a dynamic visual landmark for which the database stored no information, including determining that the dynamic visual landmark is visually prominent relative to the scene in the imagery based on the one or more criteria of prominence.

10. The method of claim 1, wherein obtaining the indication that the driver cannot see the visual landmark includes providing a prompt via a user interface regarding the visual landmark.

11. The method of claim 1, wherein obtaining the indication that the driver cannot see the visual landmark includes automatically determining whether the user successfully completed a maneuver to which the visual landmark is related.

12. A system operating in a vehicle, the system comprising:
    a camera configured to capture real-time imagery;
    a positioning module configured to determine a current geographic location of the vehicle;
    a network interface to communicate with a server system via a communication network;
    a user interface; and
    processing hardware configured to:
    determine, using the captured real-time imagery, a visual landmark that is visible to a driver of the vehicle;

obtain, using the determined visual landmark, a database that stores information related to the visual landmark, and the current geographic location of the vehicle, driving directions including an instruction that references the visual landmark,
provide the instruction to the driver via the user interface;
obtain an indication that the driver cannot see the visual landmark, and
in response to the indication, causing a numeric metric indicative of how often users find the visual landmark useful to be updated in the database, wherein the numeric metric is used to select visual landmarks corresponding to prominent physical objects disposed along the route.

13. The system of claim 12, wherein the processing hardware is further configured to:
receive, via the communication network, an image of a candidate visual landmark expected to be visible at the current geographic location of the vehicle,
compare the captured real-time imagery to the received image of the candidate visual landmark to determine whether the candidate visual landmark is visible in the real-time imagery, and
omit the candidate visual landmark from the instruction in response to determining that the candidate visual landmark is not visible in the real-time imagery.

14. The system of claim 12, wherein the processing hardware is further configured to:
send the captured real-time imagery to the server system via the communication network, wherein the server system determines whether a candidate visual landmark is visible in the real-time imagery, and
receive the instruction from the server system in response to the sent captured real-time imagery.

15. The system of claim 12, wherein the processing hardware is further configured to:
determine whether the captured real-time imagery depicts an object of a certain predetermined class,
determine whether the object is prominent within the real-time imagery based on at least one of size or color of the object, and
in response to determining that the object is prominent, select the object as the visual landmark.

16. The system of claim 15, wherein to determine whether the captured real-time imagery depicts an object of a certain predetermined class, the processing hardware implements a convolutional neural network with semantic segmentation.

17. A method for providing driving directions, the method comprising:
receiving, by one or more processors at a mobile system operating in a vehicle, a request for driving directions to a destination from a driver of the vehicle;
retrieving, by the one or more processors, a video feed from a camera mounted in the vehicle to obtain real-time imagery;
determining, by the one or more processors, a visual landmark that is visible to a driver of the vehicle in the captured real-time imagery,
obtaining, using the determined visual landmark, a database that stores information related to the visual landmark, and a current location of the vehicle, the driving directions including an instruction that references the visual landmark;
providing, by the one or more processors at the mobile system, the instruction to the driver in response to the request;
obtaining, by the one or more processors, an indication that the driver cannot see the visual landmark; and
in response to the indication, causing a numeric metric indicative of how often users find the visual landmark useful to be updated in the database, wherein the numeric metric is used to select visual landmarks corresponding to prominent physical objects disposed along the route.

18. The method of claim 17, further comprising:
selecting a candidate visual landmark that is expected to be visible at the current geographic location of the vehicle, including retrieving an image of the candidate visual landmark;
automatically processing the real-time imagery to determine whether the candidate visual landmark is visible in the real-time imagery; and
omitting the candidate visual landmark from the instruction in response to determining that the candidate visual landmark is not visible in the real-time imagery.

19. The method of claim 18, wherein automatically processing the real-time imagery includes:
sending the real-time imagery from the mobile system to a server system via a communication network; and
automatically processing the real-time imagery at the sever system.

20. The method of claim 17, wherein receiving the real-time imagery includes receiving the real-time imagery from an external camera coupled to the mobile device via a short-range communication link.

* * * * *